United States Patent
Kawashima

(10) Patent No.: US 12,092,123 B2
(45) Date of Patent: Sep. 17, 2024

(54) CONTROL APPARATUS AND VACUUM PUMP PROVIDED WITH SAID CONTROL APPARATUS

(71) Applicant: Edwards Japan Limited, Yachiyo (JP)

(72) Inventor: Toshiaki Kawashima, Yachiyo (JP)

(73) Assignee: Edwards Japan Limited, Yachiyo (JP)

( * ) Notice: Subject to any disclaimer, the term of this patent is extended or adjusted under 35 U.S.C. 154(b) by 391 days.

(21) Appl. No.: 17/434,306

(22) PCT Filed: Mar. 9, 2020

(86) PCT No.: PCT/JP2020/009953
§ 371 (c)(1),
(2) Date: Aug. 26, 2021

(87) PCT Pub. No.: WO2020/189367
PCT Pub. Date: Sep. 24, 2020

(65) Prior Publication Data
US 2022/0170473 A1    Jun. 2, 2022

(30) Foreign Application Priority Data
Mar. 15, 2019   (JP) ................................ 2019-048517

(51) Int. Cl.
*F04D 9/04*   (2006.01)
*F04D 19/04*   (2006.01)
(Continued)

(52) U.S. Cl.
CPC ......... *F04D 27/001* (2013.01); *F04D 19/042* (2013.01); *F04D 25/06* (2013.01); *F04D 29/058* (2013.01)

(58) Field of Classification Search
None
See application file for complete search history.

(56) References Cited

U.S. PATENT DOCUMENTS 6,215,218 B1 *  4/2001  Ueyama .............. F16C 32/0489
                                                  310/90.5
7,091,641 B2 *  8/2006  Kawashima ........ F16C 32/0457
                                                  310/90.5
(Continued)

FOREIGN PATENT DOCUMENTS

CN          1794560 A     6/2006
CN        105121875 A    12/2015
(Continued)

OTHER PUBLICATIONS

Translation and Original International Search Report from counterpart International Application No. PCT/JP2020/009953 dated Jun. 9, 2020, 8 pp.
(Continued)

*Primary Examiner* — Kayla Mccaffrey
(74) *Attorney, Agent, or Firm* — Shumaker & Sieffert, P.A.

(57) ABSTRACT

A control apparatus includes a constant storage portion that stores constant values of an electromagnet coil including a resistance value Rm, an inductance Lm, a sampling time Ts, etc. A current storage portion stores previous current command values Ir having been regularly sampled by a microcomputer inside a current control circuit. A low-frequency feedback circuit generates a signal for suppressing an error between DC components and low-frequency components of an input current command value Ir and a detected current value IL and outputs the signal. An output voltage computing circuit calculates, based on the input current command value Ir[n+1], a stored value Ir[n] of the current storage portion, a stored value of a constant storage portion, and the signal of the low-frequency feedback circuit, a voltage for suppling the electromagnet coil with a current in accordance with a command, and outputs the calculated voltage.

8 Claims, 16 Drawing Sheets

(51) Int. Cl.
  *F04D 25/06*  (2006.01)
  *F04D 27/00*  (2006.01)
  *F04D 29/058* (2006.01)
  *H02K 7/09*   (2006.01)

(56) References Cited

U.S. PATENT DOCUMENTS

| | | | |
|---|---|---|---|
| 7,292,425 B2 * | 11/2007 | Kawashima | ........ F16C 32/0476 |
| | | | 310/90.5 |
| 9,624,974 B2 * | 4/2017 | Kozaki | ................... H02P 21/36 |
| 10,371,159 B2 | 8/2019 | Kawashima | |
| 10,619,669 B2 * | 4/2020 | Kozaki | ............... F16C 32/0457 |
| 10,968,949 B2 | 4/2021 | Kozaki | |
| 2016/0252099 A1 | 9/2016 | Kawashima | |

FOREIGN PATENT DOCUMENTS

| | | |
|---|---|---|
| CN | 109424646 A | 3/2019 |
| EP | 1318310 A1 | 6/2003 |
| EP | 2988009 A1 | 2/2016 |
| JP | 2014137116 A | 7/2014 |
| JP | 2014209016 A | 11/2014 |

OTHER PUBLICATIONS

Extended Search Report from counterpart European Application No. 20774296.6 dated Oct. 31, 2022, 9 pp.
First Office Action and Search Report from counterpart Chinese Application No. 202080018130.1 dated Aug. 29, 2023, 6 pp.

* cited by examiner

CONTROL APPARATUS AND VACUUM PUMP PROVIDED WITH SAID CONTROL APPARATUS

This application is a U.S. national phase application under 35 U.S.C. § 371 of international application number PCT/JP2020/009953 filed on Mar. 9, 2020, which claims the benefit of priority to JP application number 2019-048517 filed on Mar. 15, 2019. The entire contents of each of international application number PCT/JP2020/009953 and JP application number 2019-048517 are incorporated herein by reference.

TECHNICAL FIELD

The present disclosure relates to a control apparatus and a vacuum pump provided with the control apparatus and, in particular, relates to a control apparatus which is capable of realizing a magnetic bearing with reduced vibration and noise by preventing noise from contaminating a current controlled variable and which achieves cost reduction and downsizing of a circuit and to a vacuum pump provided with the control apparatus.

BACKGROUND

Magnetic bearings are used in rotating devices such as turbo-molecular pumps used in semiconductor manufacturing processes and in electron microscopes. A conventional magnetic bearing excitation circuit will now be described based on a configuration example of a magnetic bearing of a turbo-molecular pump.

A sectional view of a turbo-molecular pump as a configuration example of a magnetic bearing is shown in FIG. 11. In FIG. 11, the turbo-molecular pump is provided with a rotating body 103 that includes a plurality of rotor blades 101a, 101b, 101c, . . . constituted by turbine blades for exhausting gas.

In order to bear the rotating body 103, a magnetic bearing is constructed by arranging an upper radial direction electromagnet 105a, a lower radial direction electromagnet 107a, and an axial direction electromagnet 109a. In addition, an upper radial direction sensor 105b, a lower radial direction sensor 107b, and an axial direction sensor 109b are provided.

With the upper radial direction electromagnet 105a and the lower radial direction electromagnet 107a, four electromagnets are constructed by electromagnet windings configured as shown in FIG. 12 that represents respective transverse sectional views of the upper radial direction electromagnet 105a and the lower radial direction electromagnet 107a. Of the four electromagnets, two each are arranged so as to oppose each other to construct magnetic bearings of two axes in an X-axis direction and a Y-axis direction.

In detail, one electromagnet is formed by arranging electromagnet windings 111 respectively wound around two adjacent core protruding portions so as to have mutually reverse polarities. The one electromagnet constitutes a single pair with an electromagnet constructed by electromagnet windings 113 of a core protruding portion that opposes the one electromagnet across the rotating body 103, and each electromagnet attracts the rotating body 103 in a positive direction or a negative direction of the X axis.

In addition, in a direction of the Y axis that is perpendicular to the X axis, two electromagnet windings 115 and two opposing electromagnet windings 117 constitute a pair of electromagnets that oppose each other with respect to the Y-axis direction in a similar manner to that described above.

Axial direction electromagnets 109a are constructed as a single pair by two electromagnet windings 121 and 123 that sandwich an armature 103a of the rotating body 103 as shown in FIG. 13 that represents a longitudinal sectional view of the axial direction electromagnets 109a. Each of the two electromagnets 109a constituted by the respective electromagnet windings 121 and 123 applies an attractive force that attracts the armature 103a in a positive direction or a negative direction of a rotational axis.

In addition, the upper radial direction sensor 105b and the lower radial direction sensor 107b are made up of four sensing coils arranged on the two axes of X and Y that correspond to the electromagnets 105a and 107a described above and detect a displacement in a radial direction of the rotating body 103. The axial direction sensors 109b detect a displacement in an axial direction of the rotating body 103. These sensors are configured to send respective detection signals to a magnetic bearing control apparatus (not illustrated).

Based on the sensor detection signals, the magnetic bearing control apparatus is configured to magnetically levitate and support the rotating body 103 by individually adjusting attractive forces of a total of 10 electromagnets that constitute the upper radial direction electromagnet 105a, the lower radial direction electromagnet 107a, and the axial direction electromagnets 109a by PID control and the like.

Next, a magnetic bearing excitation circuit that excites and drives each electromagnet of the magnetic bearing configured as described above will be explained. FIG. 14 shows an example of a magnetic bearing excitation circuit that controls, according to a pulse-width modulation system (PWM control), a current that flows through electromagnet windings.

In FIG. 14, of the electromagnet winding 111 that constitutes one electromagnet, one end is connected to a positive electrode of a power supply 133 via a transistor 131 and another end is connected to a negative electrode of the power supply 133 via a transistor 132.

In addition, a cathode of a diode 135 for current regeneration is connected to the one end of the electromagnet winding 111 and an anode of the diode 135 is connected to the negative electrode of the power supply 133. In a similar manner, a cathode of a diode 136 is connected to the positive electrode of the power supply 133 and an anode of the diode 136 is connected to the other end of the electromagnet winding 111. An electrolytic capacitor 141 for stabilization is connected between the positive electrode and the negative electrode of the power supply 133.

In addition, a current detection circuit 139 is connected to a source side of the transistor 132, and a current detected by the current detection circuit 139 is input to a control circuit 137.

The excitation circuit 110 constructed as described above corresponds to the electromagnet winding 111, and the same excitation circuit 110 is also constructed with respect to the other electromagnet windings 113, 115, 117, 121, and 123. Therefore, in a case of a five-axis control magnetic bearing, a total of 10 excitation circuits 110 are connected in parallel to the electrolytic capacitor 141.

In the configuration described above, a current increases when both transistors 131 and 132 are switched on but the current decreases when both transistors 131 and 132 are switched off. In addition, a flywheel current is held when any one of the transistors 131 and 132 is switched on. Passing the flywheel current enables hysteresis loss to be reduced and power consumption to be kept low.

In addition, by measuring the flywheel current with the current detection circuit 139, an electromagnet current IL that flows through the electromagnet winding 111 can be detected. The control circuit 137 compares a current command value with a detected value by the current detection circuit 139 to determine a pulse width in one period according to pulse-width modulation and sends a signal to gates of the transistors 131 and 132.

When the current command value is larger than the detected value, both the transistors 131 and 132 are switched on for a time corresponding to a pulse width time Tp only once during one period Ts (for example Ts=40 μs) as shown in FIG. 15. At this point, the electromagnet current IL increases.

On the other hand, when the current command value is smaller than the detected value, both the transistors 131 and 132 are switched off for a time corresponding to the pulse width time Tp only once during one period Ts as shown in FIG. 16. At this point, the electromagnet current IL decreases.

When a position of the rotating body 103 deviates from a target position, the magnetic bearing control apparatus generates a current command value for correcting the position and performs feedback control of the electromagnet current with the control circuit 137 so that the detected current value equals the current command value. The rotating body 103 is held at the target position by supplying a current that follows the current command value to the electromagnets 111, 113, 115, 117, 121, and 123.

Japanese Patent Application Laid-open No. 2014-209016 describes a computing method for adjusting an electromagnet current so as to equal a current command value.

SUMMARY

During an operation of the magnetic bearing, since an electromagnet power amplifier and an inverter for motor drive perform PWM control of power, a large amount of switching noise is generated. The noise contaminates a current signal of the control circuit 137, and a noise current is included in an electromagnet current and causes undesirable vibration and sound. In addition, the noise hardly contains low-frequency components and is mostly a high-frequency noise.

Shielding a signal with a ground line or adding a low-pass filter inside a circuit in order to reduce noise causes a size of the circuit to increase and also raises cost. In addition, enhancing the low-pass filter destabilizes control of the magnetic bearing.

Furthermore, recently, in order to reduce circuit cost, a method is adopted of instantaneously sampling a pulse current of a current detection resistor with a large amount of spike noise instead of using an expensive current detection circuit that continuously detects an electromagnet current.

The sampling method is incapable of using an anti-aliasing low-pass filter that is essential for reducing noise in digital control and is therefore substantially unable to reduce noise in a sophisticated manner.

The present disclosure has been made in consideration of such conventional problems and an object thereto is to provide a control apparatus which is capable of realizing a magnetic bearing with reduced vibration and noise by preventing noise from contaminating a current controlled variable and which achieves cost reduction and downsizing of a circuit, and to provide a vacuum pump provided with the control apparatus.

To this end, the present disclosure describes a control apparatus, including: a rotating body; and magnetic bearing means which controls a radial direction position or an axial direction position of the rotating body with an electromagnet, the control apparatus further including: a current storage portion which stores at least one first current command value having been previously set with respect to a current to be supplied to the electromagnet; and an output voltage computing circuit which computes, based on a second current command value having been newly set with respect to a current to be supplied to the electromagnet and the first current command value having been read from the current storage portion, a voltage for suppling the electromagnet with a current in accordance with a command, and outputting the voltage with respect to the electromagnet.

An AC high-frequency component is controlled by an open loop. In other words, a detected current value is not used to control the AC high-frequency component, and a necessary amplifier output is determined based on a current command value variation between the first current command value and the second current command value.

In this manner, using an estimated value obtained by calculation instead of using a detected current value in order to calculate a controlled variable of a high-frequency current prevents noise from contaminating a current controlled variable and enables a magnetic bearing with reduced vibration and noise to be realized. Since there is no need to detect a current with a high frequency, an inexpensive current detector with low frequency responsiveness can be used, and since the number of parts necessary to address noise can also be reduced, a small magnetic bearing circuit can be realized at low cost.

Furthermore, while increasing a gain of a current control loop of a circuit for suppressing an error in current control causes current control to oscillate at a high frequency in a conventional control method, since feedback control of a high frequency wave is not performed in the present system, current control does not oscillate.

In addition, the present disclosure describes a control apparatus, further including: a constant storage portion which stores a constant value necessary for controlling a current that flows through the electromagnet, wherein computation by the output voltage computing circuit is performed based on the constant value stored by the constant storage portion.

Providing the constant storage portion enables a vacuum pump with a different capacity to be handled by simply changing a constant value unique to the vacuum pump in the constant storage portion and computation by the output voltage computing circuit can be commonalized.

Furthermore, the present disclosure describes a control apparatus, further including: current detecting means which detects a current that flows through the electromagnet; and a low-frequency feedback circuit which generates a signal for suppressing an error in a DC component or a low-frequency component based on a current detected by the current detecting means and the first current command value or based on a current detected by the current detecting means and the second current command value and which outputs the signal to the output voltage computing circuit.

Since controlling a target variation of an electromagnet current based on an estimated value creates an offset error between a detected current value and a target current value with respect to the DC component, the error between the detected current value and the target current value is given to an integrator and added to a calculated current value. Since the integrator strongly attenuates high-frequency noise, adding the integrator enables an offset to be removed while hardly increasing noise.

In addition, the present disclosure describes a control apparatus, further including: a current error correction circuit which generates a signal for suppressing an error in a high-frequency component based on a current detected by the current detecting means and the first current command value or based on a current detected by the current detecting means and the second current command value and which outputs the signal to the output voltage computing circuit.

In an open-loop amplifier, since an AC high-frequency component controls a current using a current controlled variable instead of using a detected current value, an error may occur between a current command value and an actual current. The current error correction circuit is provided in order to reduce this error. The current error correction circuit generates a signal for suppressing an error between high-frequency components of an input current command value and a detected current value and outputs the signal.

Accordingly, the current error correction circuit can suppress an error between the current command value and an actual detected current value without increasing noise of an electromagnet current.

Furthermore, the present disclosure describes a control apparatus, wherein the output voltage computing circuit computes, based on pluralities of first current command values and second current command values having been previously set by the current storage portion, a voltage for suppling the electromagnet with a current in accordance with a command, and outputs the voltage with respect to the electromagnet.

Using a plurality of previous current command values enables low-pass filter characteristics to be imparted and a calculation of a pulse width can be stabilized.

In addition, the present disclosure describes a control apparatus, further including: an excitation circuit which includes a switching element that connects and disconnects the electromagnet and a power supply to and from each other; and pulse width computing means which computes a pulse width used for pulse control of the switching element for each timing, wherein the current storage portion stores a current command value Ir[n] having been previously set with respect to a current that flows through the electromagnet, and when an electromagnet inductance is denoted by Lm, an electromagnet resistance is denoted by Rm, a power-supply voltage is denoted by Vd, a sampling interval is denoted by Ts, a detected current value is denoted by IL, and a coefficient representing a polarity of an increase or decrease of a current is denoted by P[n+1], the pulse width is computed according to mathematical expression 8 based on a current command value Ir[n+1] having been newly set with respect to a current that flows through the electromagnet and the current command value Ir[n] having been read from the current storage portion.

$$Tp[n+1] = P[n+1] \times \frac{Lm}{Vd} \times \left((Ir[n+1] - Ir[n]) + \frac{Rm \times Ts \times I_L}{Lm}\right) \quad [\text{Math. 8}]$$

Furthermore, the present disclosure describes a control apparatus, further including: an excitation circuit which includes a switching element that connects and disconnects the electromagnet and a power supply to and from each other; and pulse width computing means which computes a pulse width used for pulse control of the switching element for each timing, wherein the current storage portion stores a current command value Ir[n] having been previously set with respect to a current that flows through the electromagnet, and when an electromagnet inductance is denoted by Lm, an electromagnet resistance is denoted by Rm, a power-supply voltage is denoted by Vd, a sampling interval is denoted by Ts, a detected current value is denoted by IL, a coefficient representing a polarity of an increase or decrease of a current is denoted by P[n+1], and an integral term is denoted by Yi[n], the pulse width is computed according to mathematical expression 9 based on a current command value Ir[n+1] having been newly set with respect to a current that flows through the electromagnet and the current command value Ir[n] having been read from the current storage portion.

$$Tp[n+1] = \quad [\text{Math. 9}]$$
$$P[n+1] \times \frac{Lm}{Vd} \times \left((Ir[n+1] - Ir[n]) + \frac{Rm \times Ts \times I_L}{Lm} + Yi[n]\right)$$

In addition, the present disclosure describes a vacuum pump, the vacuum pump being provided with the control apparatus according to any one of claims 1 to 7.

As described above, since the present disclosure adopts a configuration in which a voltage for suppling an electromagnet with a current in accordance with a command is computed based on a second current command value having been newly set with respect to a current to be supplied to the electromagnet and a first current command value having been read from a current storage portion, a detected current value is not used to calculate a controlled variable of a high-frequency current. Since using an estimated value obtained by calculation in this manner prevents noise from contaminating a current controlled variable, a magnetic bearing with reduced vibration and noise can be realized. Since there is no need to detect a current with a high frequency, an inexpensive current detector with low frequency responsiveness can be used, and since the number of parts necessary to address noise can also be reduced, a small magnetic bearing circuit can be realized at low cost.

DETAILED DESCRIPTION

Hereinafter, a first embodiment of the present disclosure will be described.

A variation in an electromagnet current when a pulse voltage is applied to electromagnets 111, 113, 115, 117, 121, and 123 by PWM control can be approximately estimated by a calculation without having to directly detect the electromagnet current as long as a voltage value and a pulse width of the pulse voltage and an inductance value and a resistance value of the electromagnet are known. Therefore, when calculating a target variation of a current, an estimated value obtained by a calculation is used instead of a detected current value in order to avoid being affected by noise that contaminates a detected current signal.

However, since controlling a target variation of an electromagnet current based on an estimated value creates an offset error between a detected current value and a target current value with respect to the DC component, the error between the detected current value and the target current value is given to an integrator and added to a calculated current value. Since the integrator strongly attenuates high-frequency noise, adding the integrator enables an offset to be removed while hardly increasing noise.

DC to AC low-frequency components perform feedback control using a signal of a current detection circuit 139. Since a strong low-pass filter can be used for the DC to AC low-frequency components, noise can be strongly reduced. On the other hand, a detected current value is not used with respect to an AC high-frequency component, and a pulse width of a necessary amplifier output voltage is determined based on a variation (Ir[n+1]−Ir[n]) between current command values.

Let us define an electromagnet voltage as Vm, an electromagnet inductance as Lm, an electromagnet resistance as Rm, a power-supply voltage as Vd, a sampling interval as Ts, a pulse-on duty during PWM control as D, a current command value to an electromagnet as Ir, and a detected current value as IL. According to Kirchhoff's laws, mathematical expression 1 is satisfied between the electromagnet current IL that flows through an electromagnet winding 111 and the electromagnet voltage Vm.

$$Vm = Lm \times \frac{\Delta I_L}{\Delta t} + Rm \times I_L \qquad [\text{Math. 1}]$$

Figure 1:
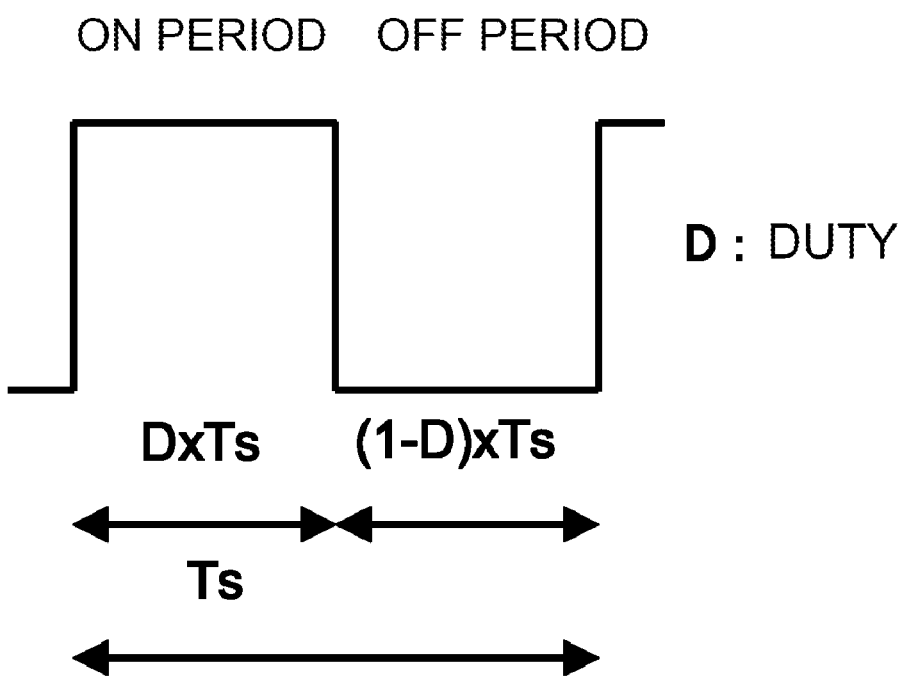
FIG. 1 is a simplified view showing a relationship between a pulse and a duty of PWM control.

FIG. 1 is a simplified view showing a relationship between a pulse and a duty of PWM control. In one period Ts, a detected current value $\Delta I_{L on}$ during a pulse ON period (D×Ts) is represented by mathematical expression 2.

$$\Delta I_L \text{on} = \frac{(Vd - R \times I_L)}{Lm} \times D \times Ts \qquad [\text{Math. 2}]$$

On the other hand, a detected current value ΔILoff during a pulse OFF period ((1−D)×Ts) is represented by mathematical expression 3.

$$\Delta I_L \text{off} = \frac{(-R \times I_L)}{Lm} \times (1 - D) \times Ts \qquad [\text{Math. 3}]$$

From mathematical expression 2 and mathematical expression 3, a detected current value ΔIL of one period Ts is calculated as mathematical expression 4.

$$\Delta I_L = \Delta I_L \text{on} + \Delta I_L \text{off} = \frac{Vd \times D \times Ts}{Lm} - \frac{Rm \times I_L \times Ts}{Lm} \qquad [\text{Math. 4}]$$

From mathematical expression 4, the duty D is calculated as mathematical expression 5.

$$D = \left(\Delta I_L + \frac{Rm \times I_L \times Ts}{Lm}\right) \times \frac{Lm}{Vd \times Ts} \qquad [\text{Math. 5}]$$

In mathematical expression 5, since a variation in IL is gradual, a detected current value of a low-frequency component is used in IL.

It is assumed that ΔIL represents a difference between a next current command value Ir[n+1] and a present current command value Ir[n].

Therefore, a calculated value of the duty D is as represented by mathematical expression 6.

$$D = \left((Ir[n+1] - Ir[n]) + \frac{Rm \times I_L \times Ts}{Lm}\right) \times \frac{Lm}{Vd \times Ts} \qquad [\text{Math. 6}]$$

With respect to a high-frequency component, while a deviation occurs between a current command and an actual current, the deviation has little or no effect. Even if a deviation occurs in a current, a rotating body 103 levitates at center due to position feedback.

On the other hand, since a low-frequency component is normally controlled, problems such as an overcurrent do not occur.

Mathematical expressions will now be organized by introducing a coefficient P[n] representing a polarity of an increase or decrease of a current. By replacing ΔIL with a difference between the next current command value Ir[n+1] and the present current command value Ir[n], in a calculation formula that is controlled by an open loop, a next duty D is represented by mathematical expression 7 and a next pulse width Tp[n+1] is represented by mathematical expression 8.

$$D = \left((Ir[n+1] - Ir[n]) + \frac{Rm \times Ts \times I_L}{Lm}\right) \times \frac{Lm}{Vd \times Ts} \qquad [\text{Math. 7}]$$

$$Tp[n+1] = P[n+1] \times \frac{Lm}{Vd} \times \left((Ir[n+1] - Ir[n]) + \frac{Rm \times Ts \times I_L}{Lm}\right) \qquad [\text{Math. 8}]$$

Next, by completing a calculation formula for control by adding a feedback function of DC and AC low-frequency components, the next pulse width Tp[n+1] is represented by mathematical expression 9.

$$Tp[n+1] = \qquad \text{[Math. 9]}$$
$$P[n+1] \times \frac{Lm}{Vd} \times \left((Ir[n+1] - Ir[n]) + \frac{Rm \times Ts \times I_L}{Lm} + Yi[n]\right)$$

Yi[n] is as represented by mathematical expression 10, where Ki denotes an integral coefficient.

$$Yi[n] = Ki \times (Ir[n] - I_L[n]) + Yi[n-1] \qquad \text{[Math. 10]}$$

To provide a comparison with conventional art, for reference's sake, mathematical formulas described in Japanese Patent Application Laid-open No. 2014-209016 will be presented and explained below.

Conventionally, ΔIL is represented by mathematical expression 11 using a next current command value Ir[n+1], a present detected current value IL[n], and a present pulse width Tp[n].

$$Ir[n] \cong I_L[n] + \Delta I_L = I_L[n] + \frac{Vd \times Tp[n]}{Lm} - \frac{Rm \times Ts \times I_L}{Lm} \qquad \text{[Math. 11]}$$

In this case, the next duty D is as represented by mathematical expression 12 and the next pulse width Tp[n+1] is as represented by mathematical expression 13.

$$D = \left((Ir[n+1] - Ir[n]) - \frac{Vd \times Tp[n]}{Lm} + \frac{2 \times Rm \times Ts \times I_L}{Lm}\right) \times \frac{Lm}{Vd \times Ts} \qquad \text{[Math. 12]}$$

$$Tp[n+1] = P[n+1] \times \frac{Lm}{Vd} \times \qquad \text{[Math. 13]}$$
$$\left((Ir[n+1] - Ir[n]) - \frac{P[n] \times Vd \times Tp[n]}{Lm} + \frac{2 \times Rm \times Ts \times I_L}{Lm}\right)$$

A mathematical formula for calculating the next pulse width Tp[n+1] when a feedback gain KA, an inductance correction gain KL, and an integral term Yi are added in order to improve accuracy of control is as represented by mathematical expression 14.

$$Tp[n+1] = P[n+1] \times \frac{KA \times Lm}{Vd} \times \qquad \text{[Math. 14]}$$
$$\left((Ir[n+1] - I_L[n]) \times KL - \frac{P[n] \times Vd \times Tp[n]}{Lm} + \frac{2 \times Rm \times Ts \times I_L}{Lm} + Yi[n]\right)$$

The integral term Yi is as represented by mathematical expression 10.

Figure 2:
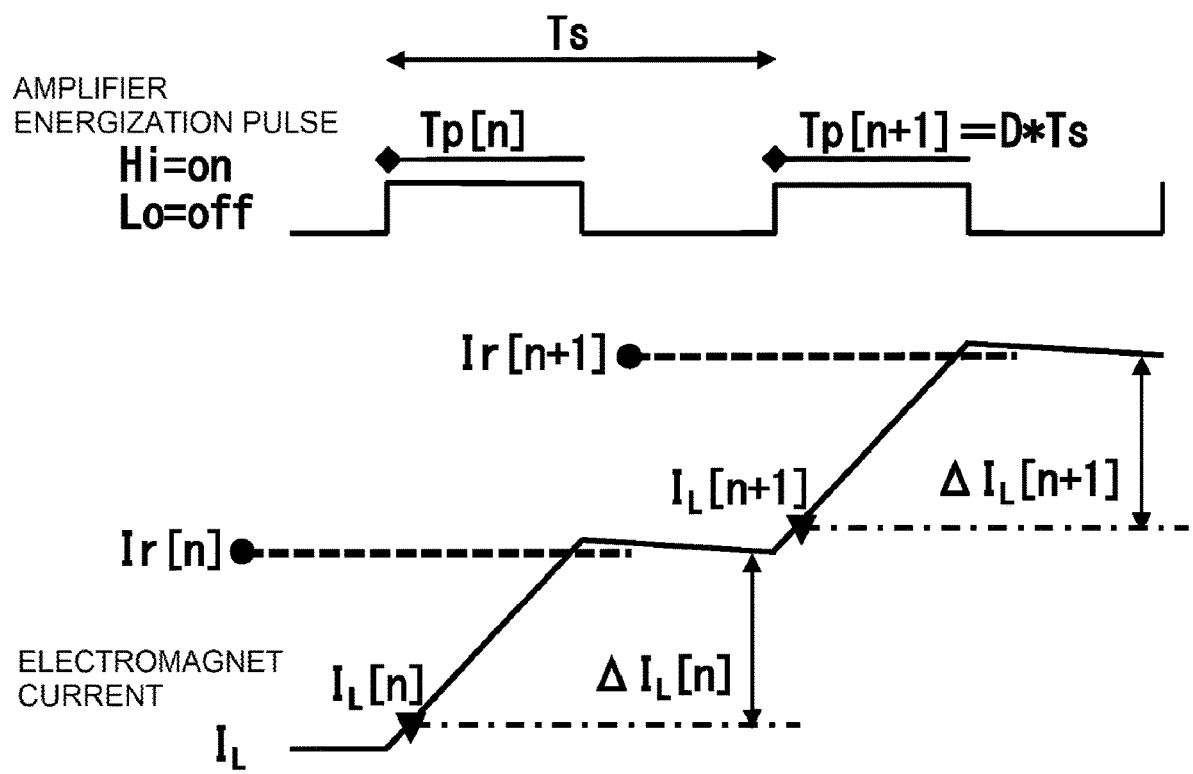
FIG. 2 is a time chart showing a relationship between a pulse of PWM control and an electromagnet current.

In other words, in the time chart shown in FIG. 2, the next pulse width Tp[n+1] is conventionally calculated from Ir[n+1], IL[n], and Tp[n]. By contrast, the open-loop amplifier according to the present embodiment differs in that Tp[n+1] is calculated from Ir[n+1] and Ir[n].

Next, a block diagram created based on mathematical expression 9 and mathematical expression 10 will be described. In the block diagram shown in FIG. 3, a constant storage portion 1 stores constant values of an electromagnet coil 111 including a resistance value Rm, an inductance Lm, and a sampling time Ts. In addition, a feedback gain KA and the like are also stored in the constant storage portion 1. A current storage portion 3 stores previous current command values Ir having been regularly sampled by a microcomputer inside the current control circuit 137. A low-frequency feedback circuit 5 generates a signal for suppressing an error between DC components and low-frequency components of an input current command value Ir and a detected current value IL and outputs the signal.

An output voltage computing circuit 7 calculates, based on the input current command value Ir[n+1], a stored value Ir[n] of the current storage portion, a stored value of the constant storage portion, and the signal of the low-frequency feedback circuit 5, a pulse width Tp[n+1] of an output voltage for suppling the electromagnet coil 111 with a current in accordance with a command, and outputs the output voltage calculated as Vd×Tp[n+1]/Ts.

Figure 4:
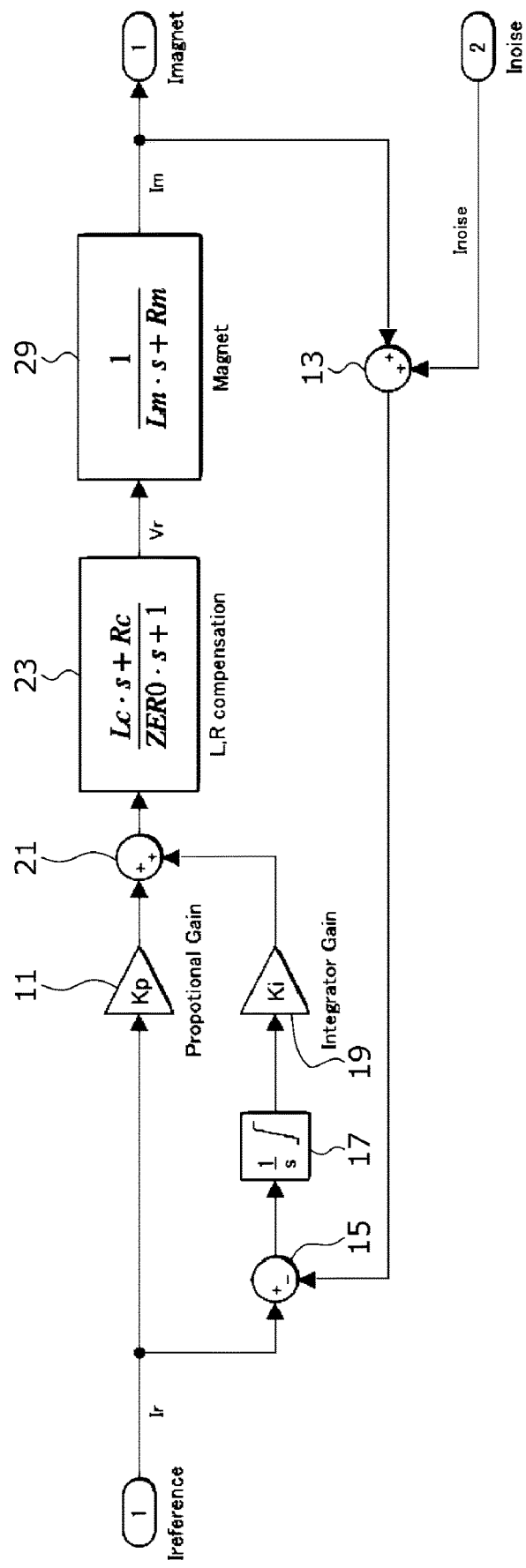
FIG. 4 is a simulation block diagram.

In addition, FIG. 4 represents a simulation block diagram when PI control is used in low-frequency control of the low-frequency feedback circuit 5. A current command Ireference is amplified by an amplifier 11. In addition, a difference of the current command Ireference from a current obtained by having an adder 13 superimpose a noise current Inoise on an electromagnet current Imagnet is calculated by a deviator 15.

An output of the deviator 15 is integrated by an integrator 17 and then amplified by an amplifier 19. An output signal of the amplifier 11 and an output signal of the amplifier 19 are added up by an adder 21. In addition, an output signal of the adder 21 is corrected with respect to a resistance and an inductance of the electromagnet 111 by a compensator 23. An electromagnet current is calculated when an output signal of the compensator 23 is input to an equalizer 29 of the electromagnet.

Figure 5:
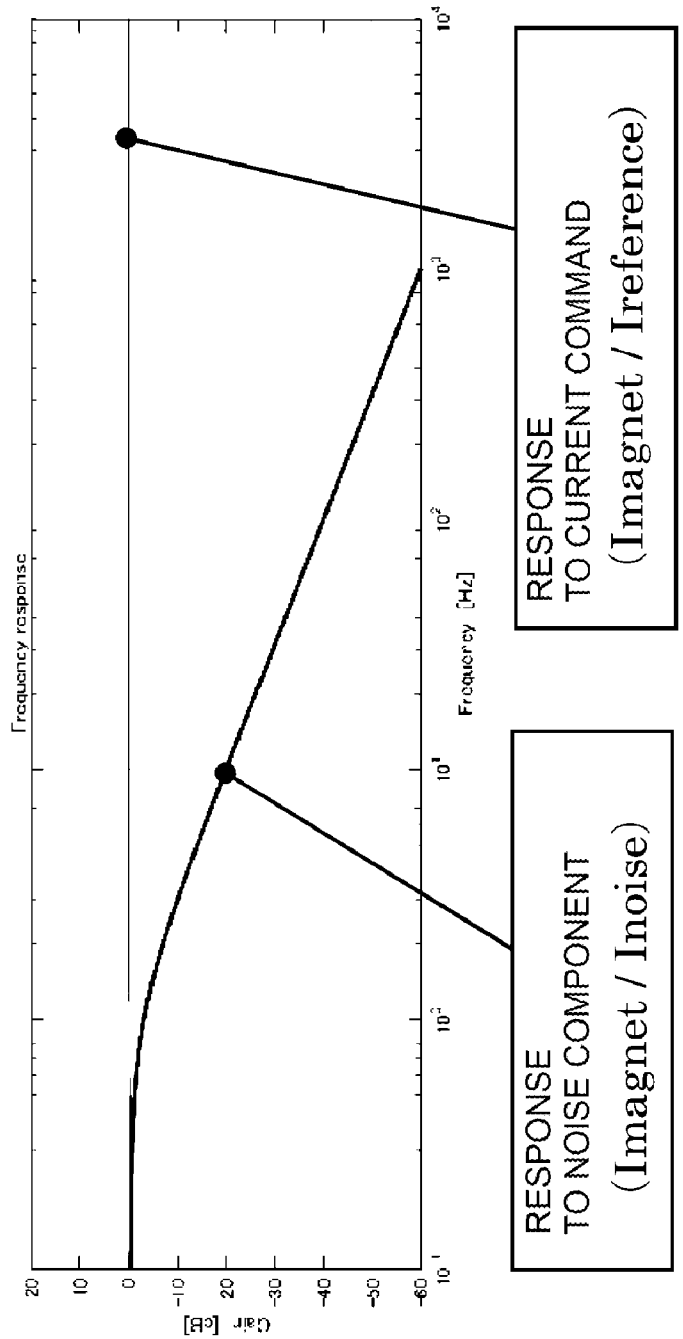
FIG. 5 represents a simulation result of response characteristics of an electromagnet current with respect to a current command and a noise current.

A simulation result of response characteristics of the electromagnet current Imagnet with respect to the current command Ireference and the noise current Inoise is as shown in FIG. 5. As is apparent from FIG. 5, the current command Ireference is output to the electromagnet without being affected whatsoever by noise. On the other hand, with respect to a noise component, it is shown that there is no effect whatsoever in a low-frequency region of under 1 to 2 kHz but the noise component is attenuated in a high-frequency region of 1 to 2 kHz or higher. Accordingly, it is shown that a noise current component that appears in an electromagnet current can be largely attenuated by the integrator 17.

In this manner, using an estimated value obtained by calculation instead of using a detected current value in order to calculate a controlled variable of a high-frequency current prevents noise from contaminating a current controlled variable and enables a magnetic bearing with reduced vibration and noise to be realized. Since there is no need to detect a current with a high frequency, an inexpensive current detector with low frequency responsiveness can be used, and since the number of parts necessary to address noise can also be reduced, a small magnetic bearing circuit can be realized at low cost.

Furthermore, while increasing a gain of a current control loop of a circuit for suppressing an error in current control causes current control to oscillate at a high frequency in a conventional control method, since feedback control of a high frequency wave is not performed in the present system, current control does not oscillate.

Next, a second embodiment of the present disclosure will be described.

When using only an immediately previous current command value Ir[n] and a next current command value Ir[n+1] to calculate a next pulse width Tp[n+1], conceivably, there is a possibility that the immediately previous current command value Ir[n] may sensitively change by an effect of a noise signal or the like that contaminates the immediately previous current command value Ir[n] from a displacement sensor and may cause a calculation result of the pulse width to sensitively fluctuate. In such a case, using a plurality of previous current command values enables the calculation of a pulse width to be stabilized.

For example, as shown in mathematical expression 15, low-pass filter characteristics can be imparted by using the immediately previous current command value Ir[n] and a further previous current command Ir[n−1]. In this case, a1 and b0 denote coefficients of a low-pass filter.

$$Tp[n+1] = \\ P[n+1] \times \frac{Lm}{Vd} \times \left((Ir[n+1] - a1 \times I_L[n-1] - b0 \times Ir[n]) + \frac{Rm \times Ts \times I_L}{Lm} + Yi[n]\right)$$ [Math. 15]

Figure 3:
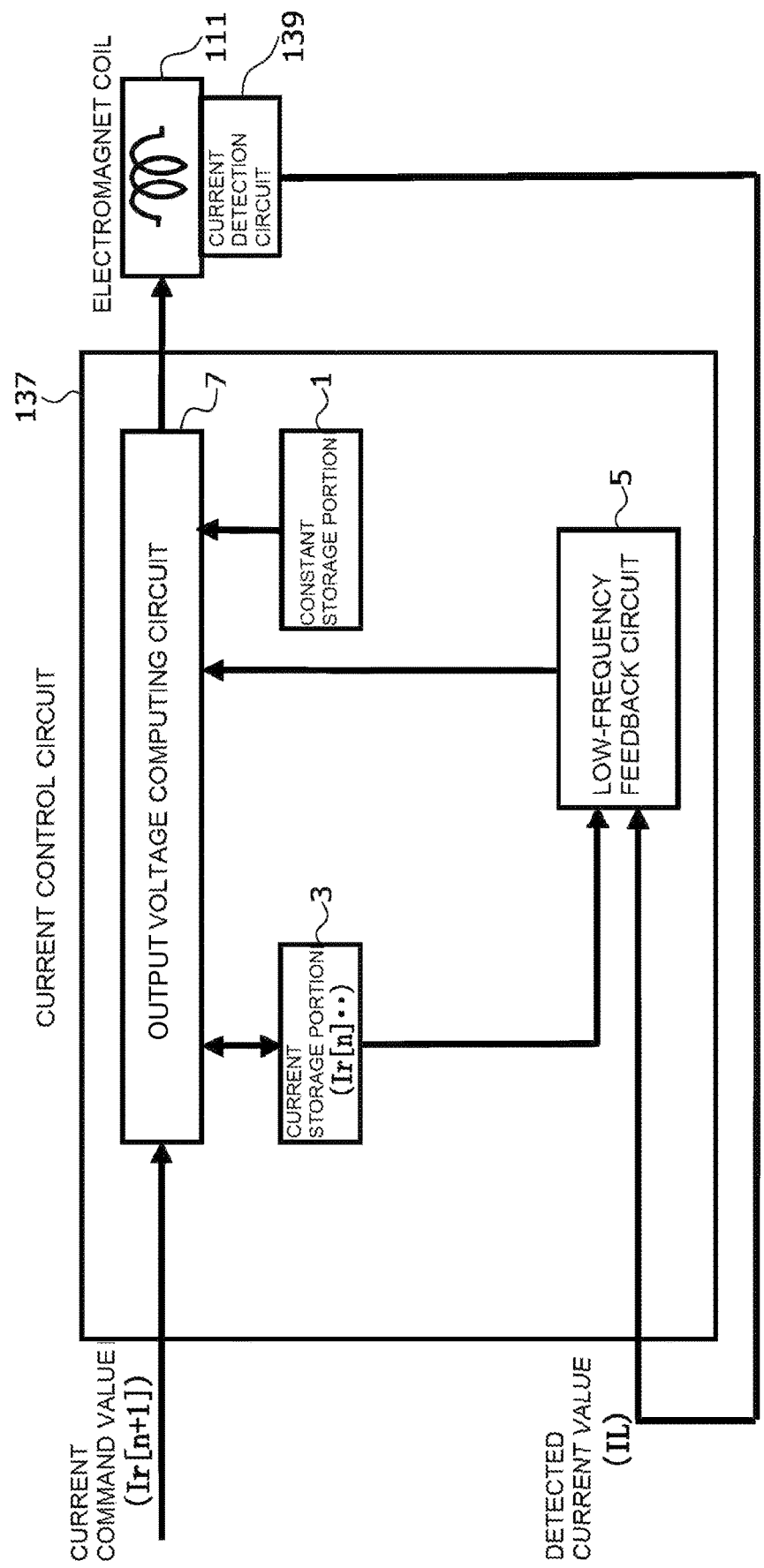
FIG. 3 is an overall block diagram of a first embodiment of the present disclosure.

A block diagram according to the second embodiment is similar to FIG. 3. In other words, in FIG. 3, the block diagram can be realized by additionally storing a1 and b0 in the constant storage portion 1 and storing a plurality of previous current command values Ir in the current storage portion 3.

Furthermore, a mathematical formula for calculating the next pulse width Tp[n+1] when a feedback gain KA and an inductance correction gain KL are introduced in order to improve accuracy of control is as represented by mathematical expression 16.

$$Tp[n+1] = P[n+1] \times \frac{KA \times Lm}{Vd} \times \\ \left((Ir[n+1] - a1 \times Ir[n-1] - b0 \times Ir[n]) \times KL + \frac{Rm \times Ts \times I_L}{Lm} + Yi[n]\right)$$ [Math. 16]

The feedback gain KA is additionally stored in the constant storage portion 1.

Compared to conventional control, since a phase delay of a detected current signal does not pose a problem, a correction of the inductance correction gain KL that corresponds to a DC current of a current control gain is no longer necessary or becomes easier.

Next, a third embodiment of the present disclosure will be described.

Figure 6:
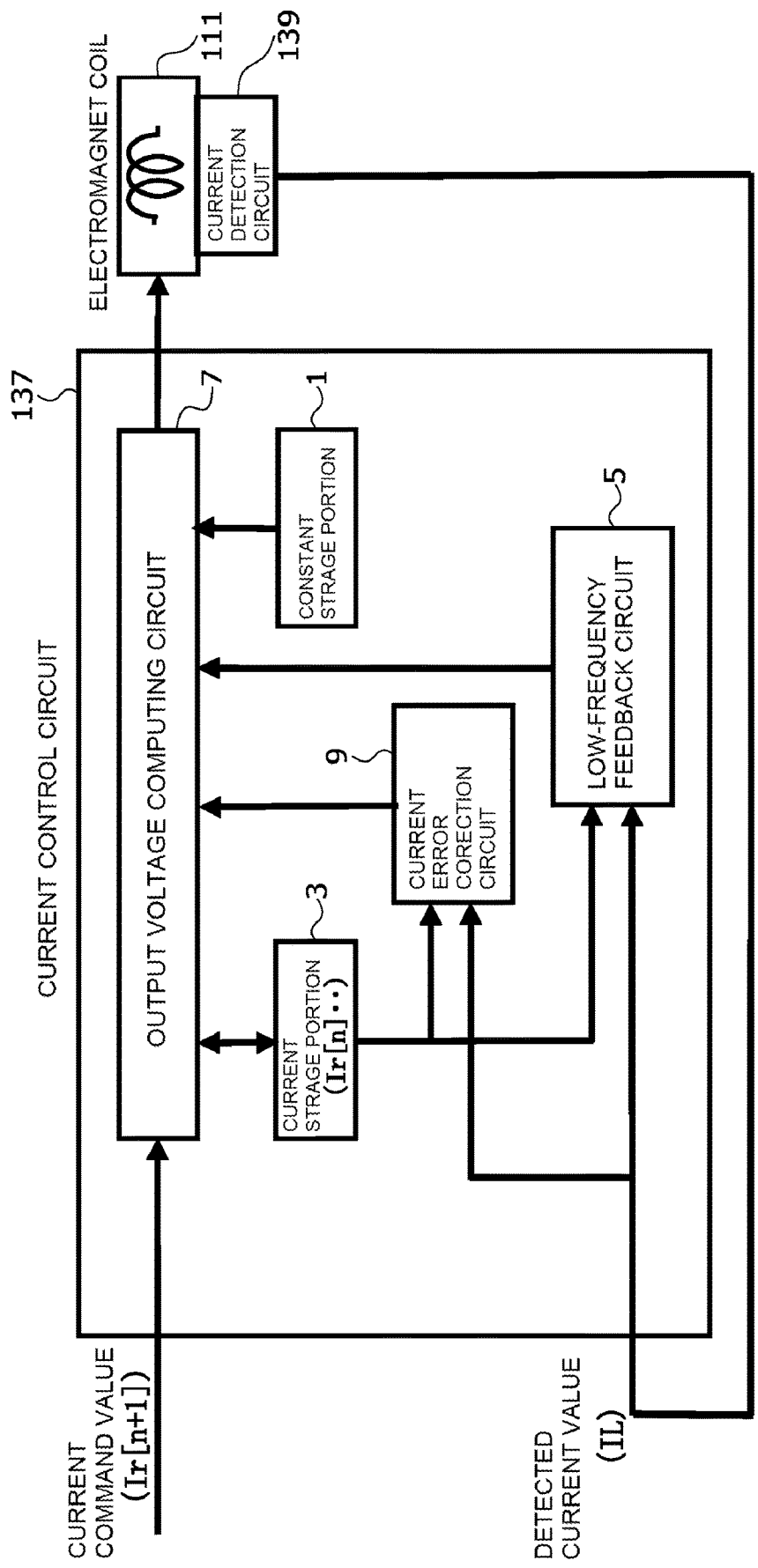
FIG. 6 is an overall block diagram of a third embodiment of the present disclosure.

In an open-loop amplifier, since an AC high-frequency component controls a current using a current command value instead of using a detected current value, an error may occur between the current command value and an actual current. A current error correction circuit 9 is added as shown in FIG. 6 in order to reduce this error. Elements that are the same as those in FIG. 3 will be denoted by same reference signs and descriptions thereof will be omitted. The current error correction circuit 9 is configured to generate a signal for suppressing an error between high-frequency components of an input current command value and a detected current value and to output the signal.

In FIG. 6, a current command value Ir and a detected current value IL are input to and stored inside the current error correction circuit 9. The current error correction circuit 9 monitors a current error Ie[n]=Ir[n]−IL[n+1]. In addition, by subjecting Ie[n] to low-pass filter processing, noise is removed and a determination is made as to whether Ie has a positive trend or a negative trend. When Ie has a positive trend, a current correction signal is sent to the output voltage computing circuit 7 so as to increase a current. In a similar manner, when Ie has a negative trend, a current correction signal is sent to the output voltage computing circuit 7 so as to reduce a current. Accordingly, the current error correction circuit 9 can suppress an error between the current command value Ir and the actual detected current value IL without increasing noise of an electromagnet current.

A specific method of realizing the current error correction circuit 9 is as described below.

The current error correction circuit 9 monitors the current command value Ir and the detected current value IL for a certain period, and when an error is found between high-frequency components of both signals, the current error correction circuit 9 generates a signal for suppressing the error and outputs the signal. For example, the current command value Ir and the detected current value IL are respectively subjected to FFT transform for one minute, and by averaging the values, frequency components of averaged current values from which a noise component has been removed are extracted.

At this point, for example, when the extracted detected current value IL is smaller than the extracted current command value Ir with respect to a given frequency, the current error correction circuit 9 sends a signal for supplying a current at the frequency in a larger amount to the output voltage computing circuit 7.

Next, modifications of the first to third embodiments of the present disclosure will be described.

As inputs to the low-frequency feedback circuit 5 and the current error correction circuit 9, normal operation is performed regardless of whether a current command value (Ir[n+1]) or a current command value (Ir[n]) is connected. To this end, diagrams of modifications will be described below.

Figure 7:
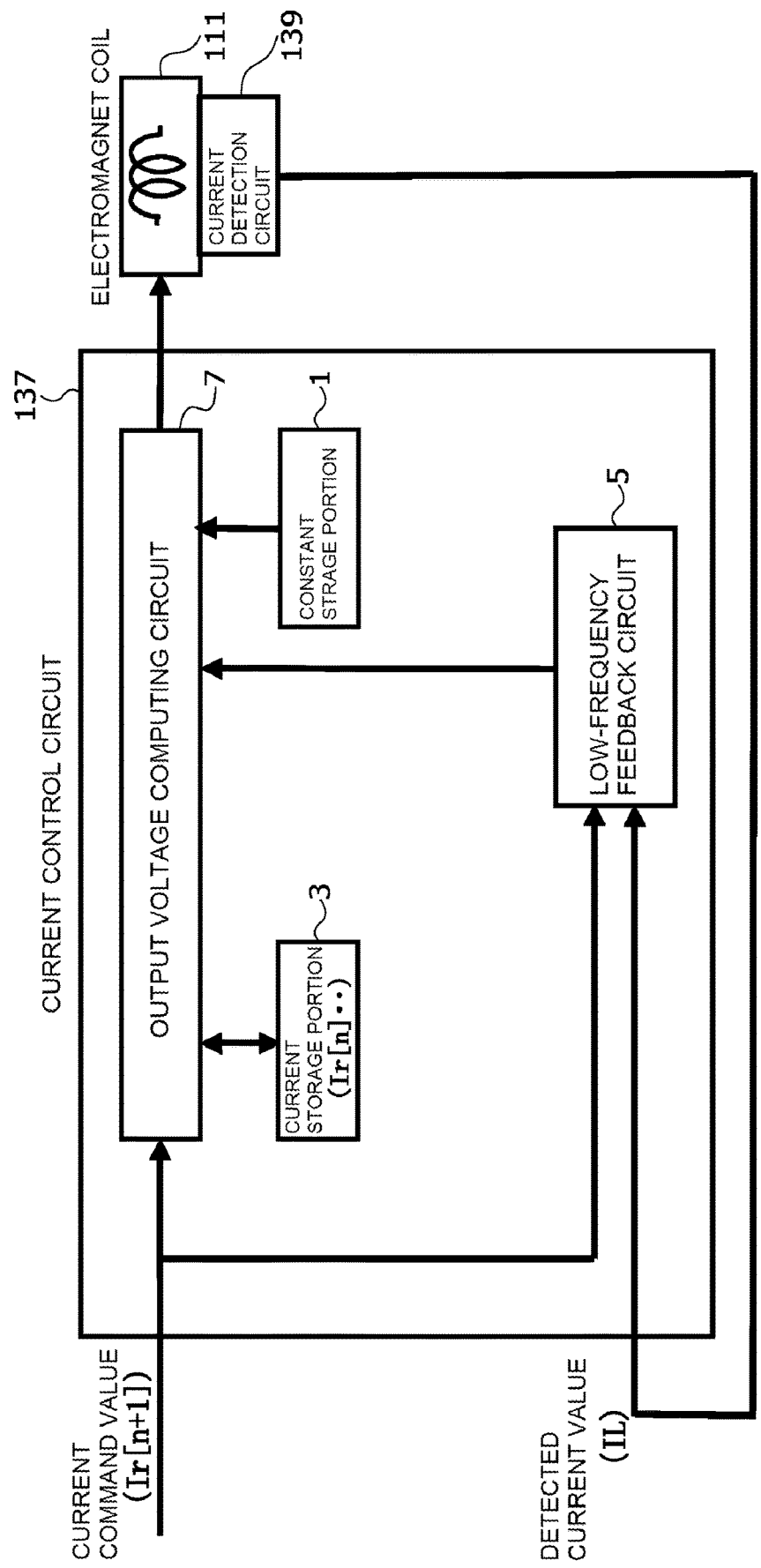
FIG. 7 represents a modification of FIG. 3.
Figure 8:
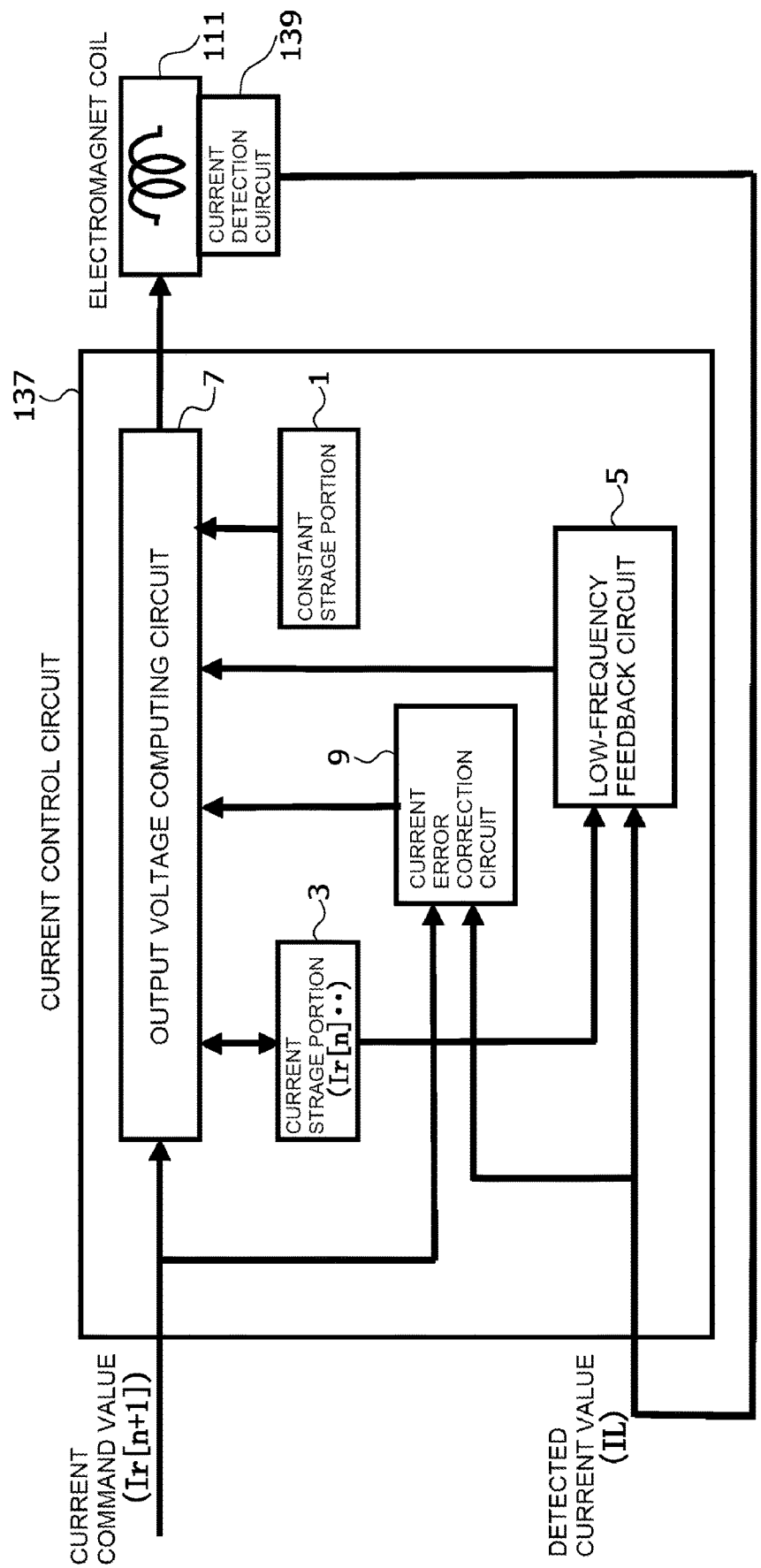
FIG. 8 represents a first modification of FIG. 6.
Figure 9:
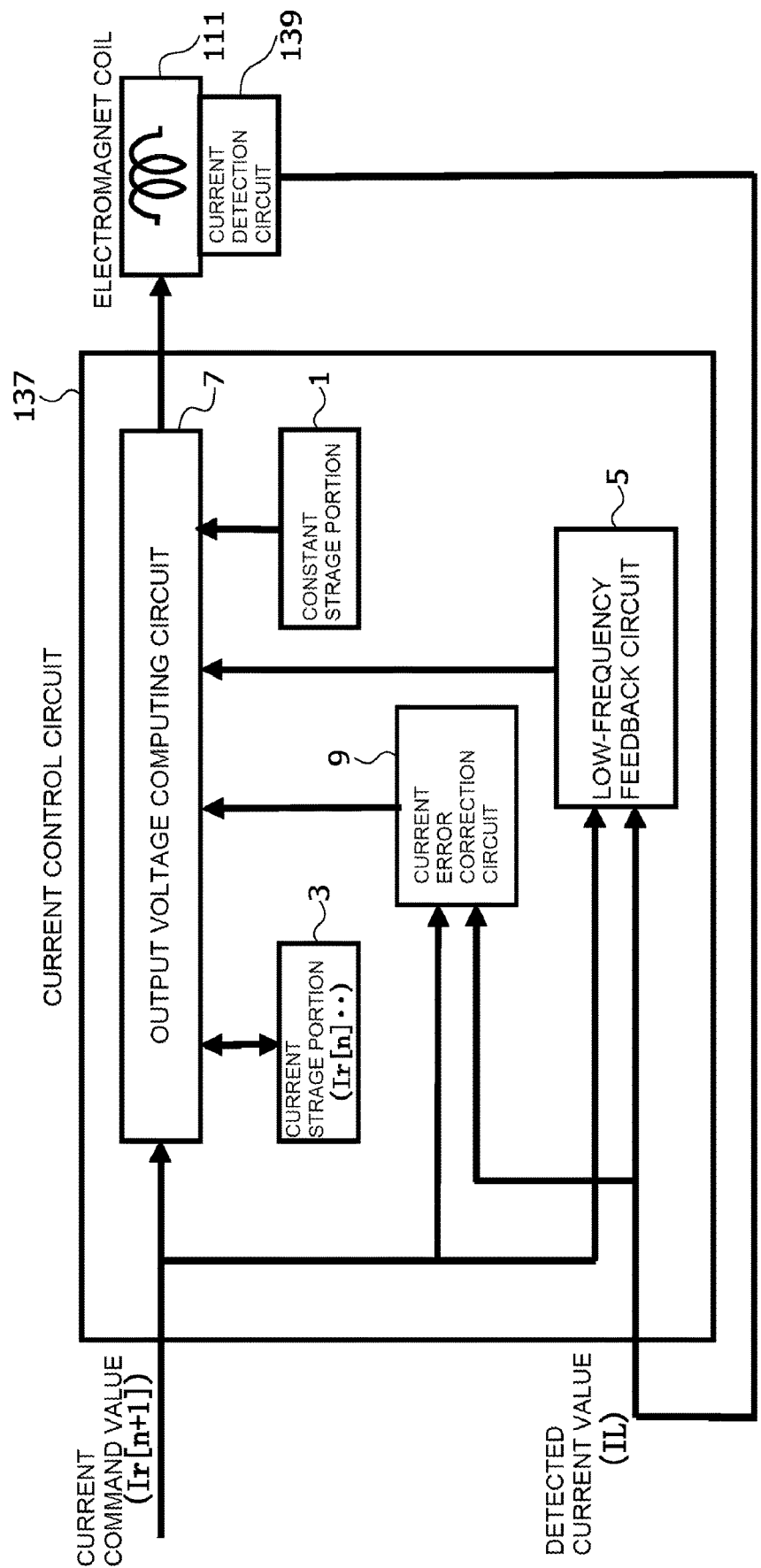
FIG. 9 represents a second modification of FIG. 6.

FIG. 7 shows a modification of FIG. 3 and represents an example in which Ir[n+1] is input to the low-frequency feedback circuit 5. FIG. 8 shows a modification of FIG. 6 which differs from FIG. 6 in that Ir[n+1] is input to the current error correction circuit 9. FIG. 9 shows yet another modification of FIG. 6 which differs from FIG. 6 in that Ir[n+1] is input to both the current error correction circuit 9 and the low-frequency feedback circuit 5.

Figure 10:
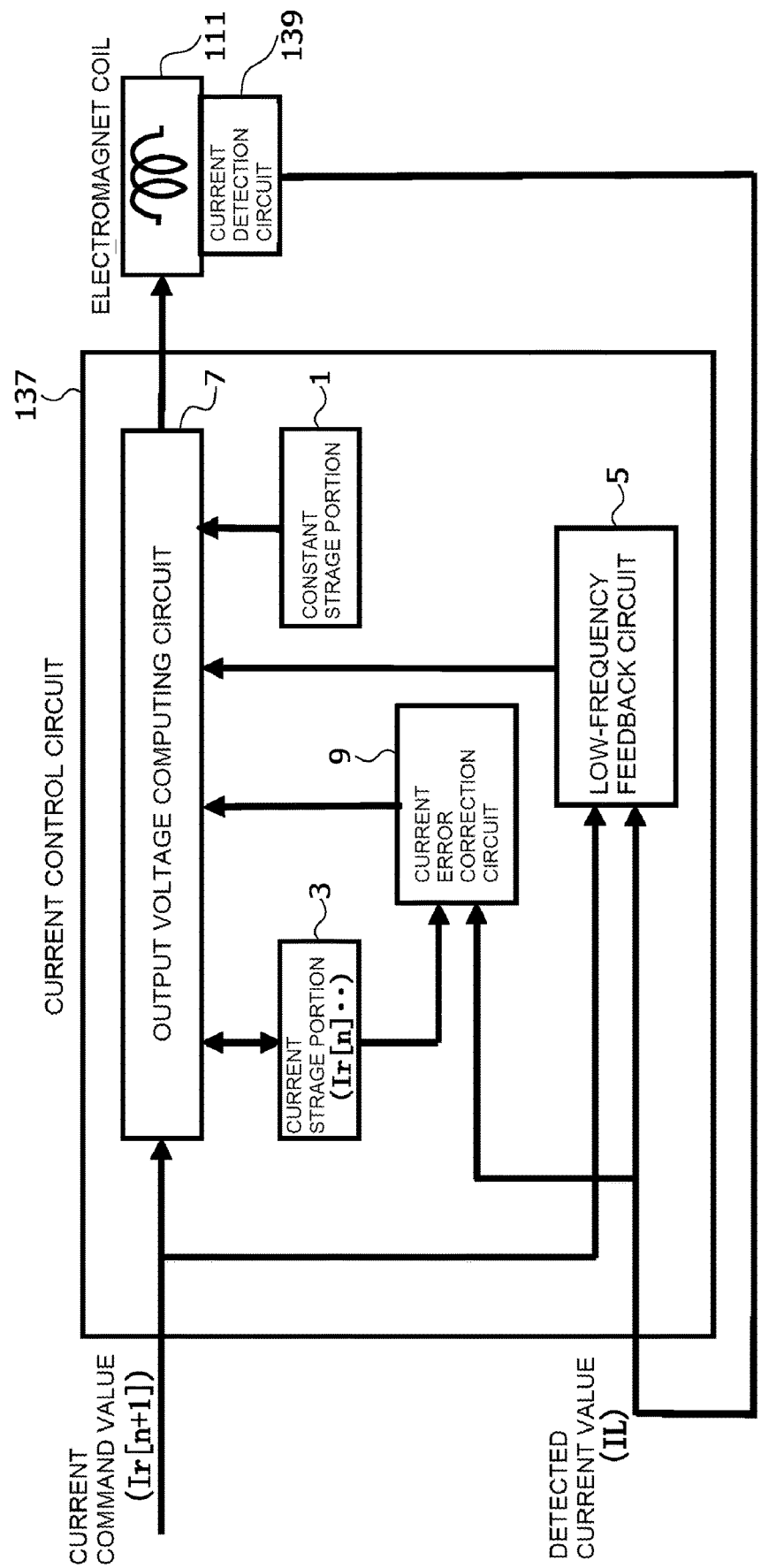
FIG. 10 represents a third modification of FIG. 6.
Figure 11:
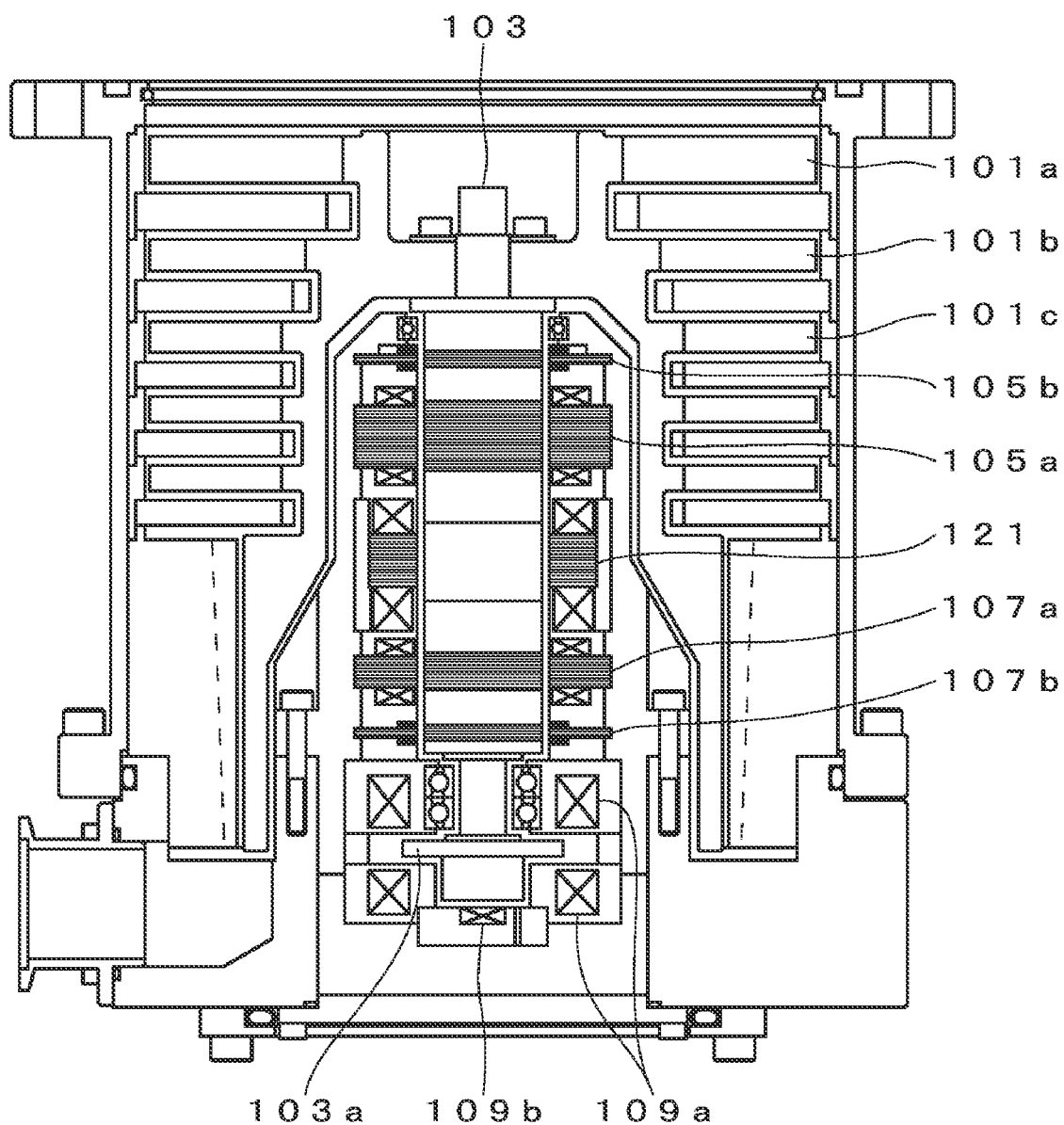
FIG. 11 is a sectional view of a turbo-molecular pump.
Figure 12:
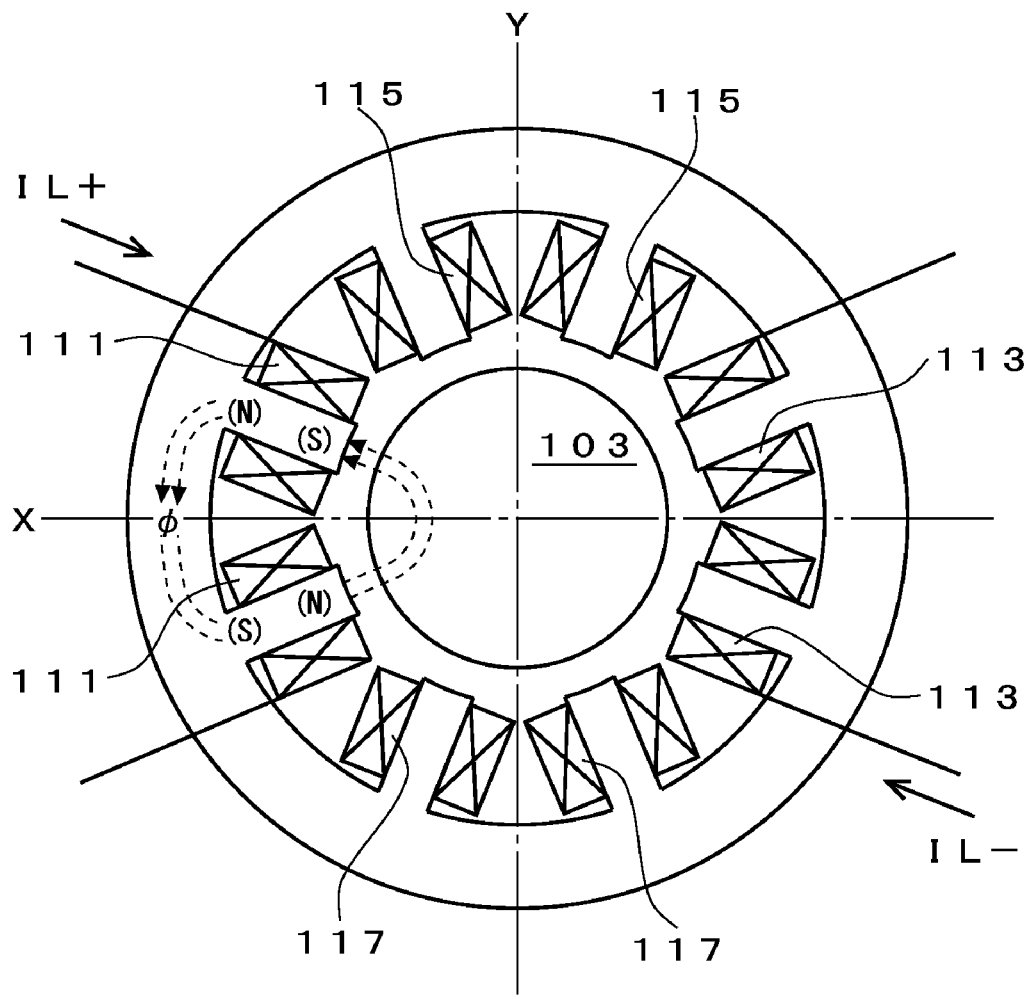
FIG. 12 is a transverse sectional view of a radial direction electromagnet.
Figure 13:
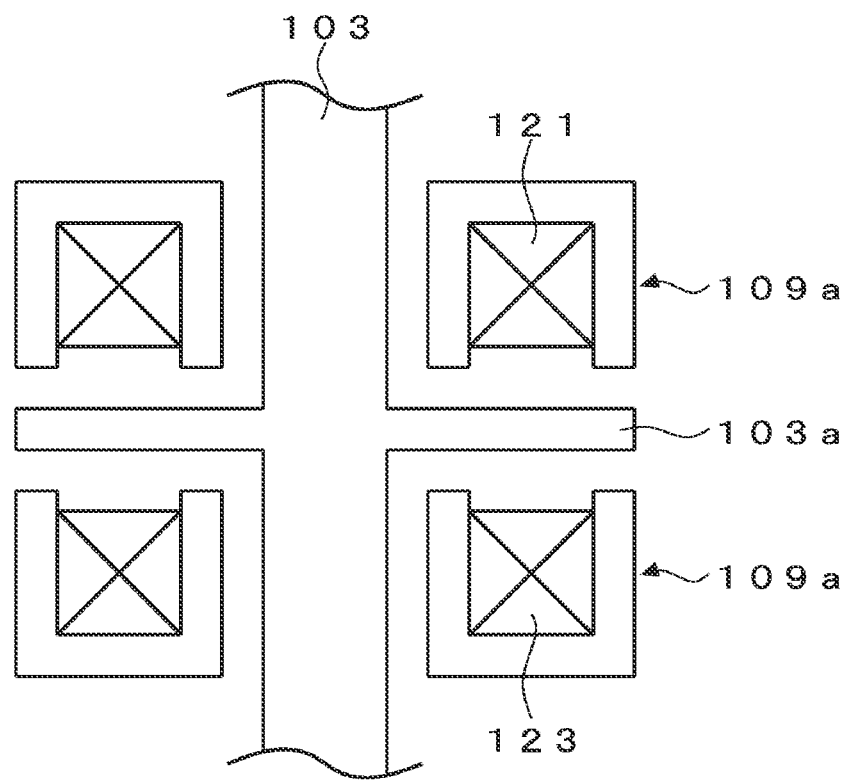
FIG. 13 is a longitudinal sectional view of an axial direction electromagnet.
Figure 14:
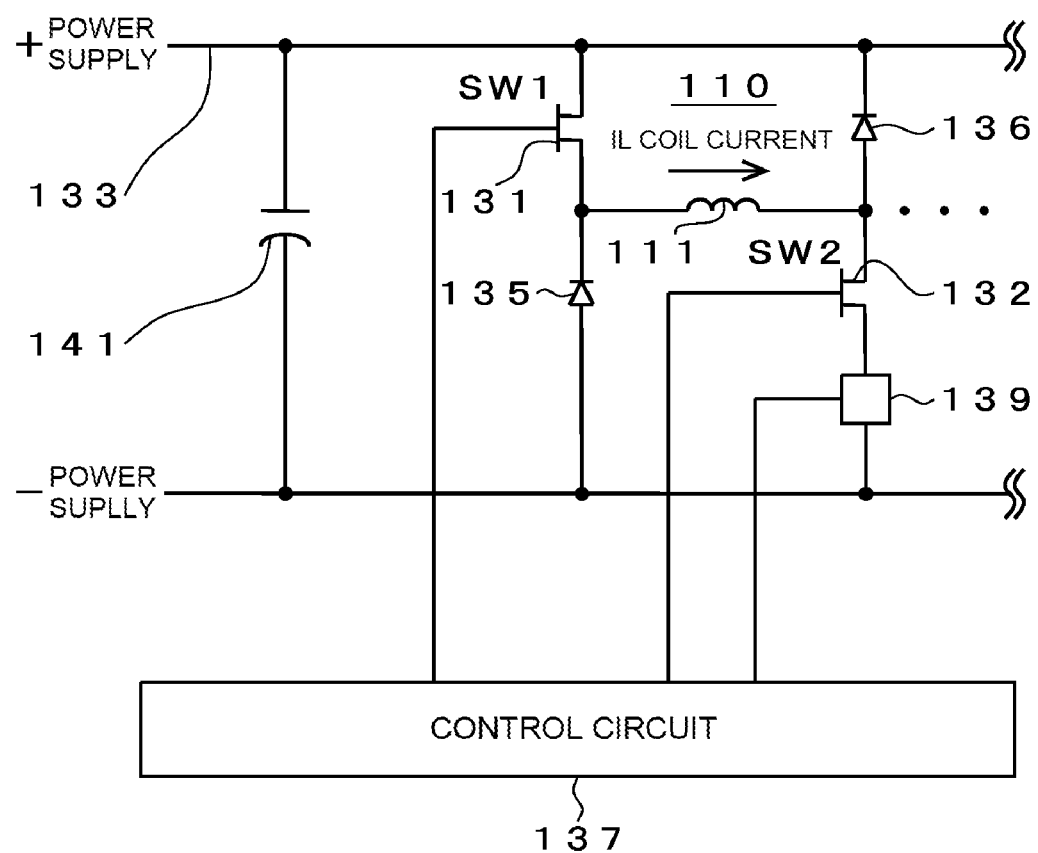
FIG. 14 represents an example of a conventional magnetic bearing excitation circuit.
Figure 15:
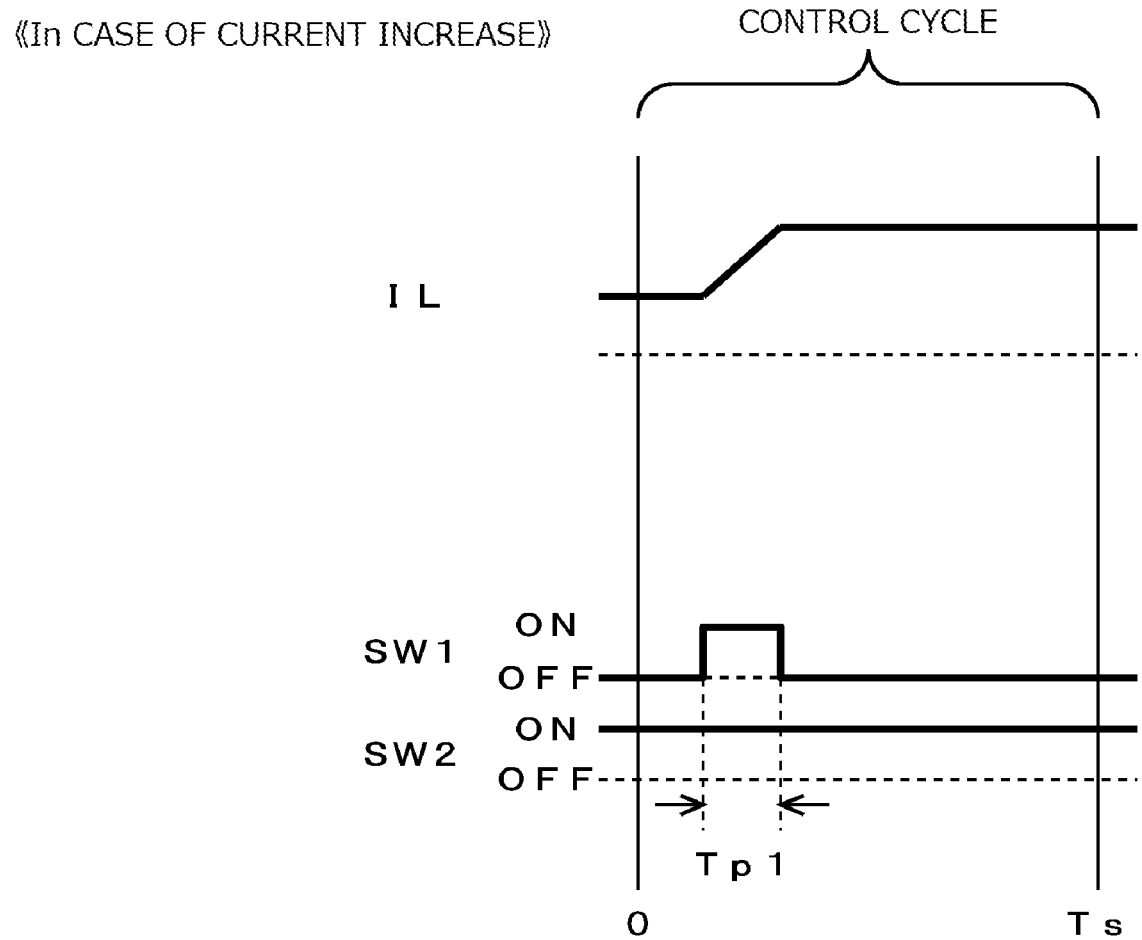
FIG. 15 is a time chart showing control when a current command value is larger than a detected value.
Figure 16:
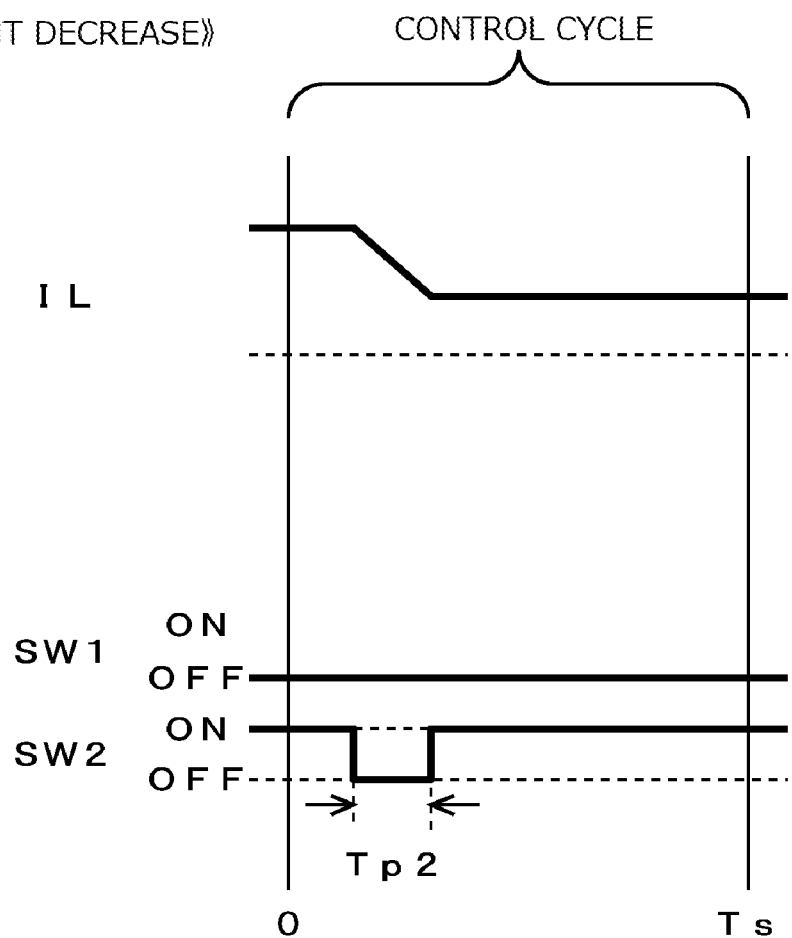
FIG. 16 is a time chart showing control when the current command value is smaller than the detected value.

FIG. 10 shows yet another modification of FIG. 6 which differs from FIG. 6 in that Ir[n+1] is input to the low-frequency feedback circuit 5.

It will be obvious to those skilled in the art that various changes and modifications may be made without departing from the spirit of the present disclosure and that the embodiments and the modifications described above can be combined in various ways.

What is claimed is:

1. A control apparatus, comprising:
a rotating body;
magnetic bearing means which controls a radial direction position or an axial direction position of the rotating body with an electromagnet;
a current storage portion which stores at least one first current command value Ir[n] having been previously set with respect to a current to be supplied to the electromagnet, wherein the at least one first current command value Ir[n] is an estimated value obtained by calculation; and an output voltage computing circuit which computes, based at least on a second current command value Ir[n+1] having been newly set with respect to a current to be supplied to the electromagnet and the at least one first current command value Ir[n] having been read from the current storage portion, a pulse width Tp[n+1] of an output voltage for suppling the electromagnet with a current in accordance with a command, and outputs the output voltage with respect to the electromagnet.

2. The control apparatus according to claim 1, further comprising:

a constant storage portion which stores a constant value for controlling a current that flows through the electromagnet, wherein the output voltage computing circuit performs the computation based on the constant value stored by the constant storage portion.

3. The control apparatus according to claim 1, further comprising:

current detecting means which detects a current that flows through the electromagnet; and a low-frequency feedback circuit which generates a signal for suppressing an error in a DC component or a low-frequency component based on a current detected by the current detecting means and the at least one first current command value Ir[n] or based on a current detected by the current detecting means and the second current command value Ir[n+1] and which outputs the signal to the output voltage computing circuit.

4. The control apparatus according to claim 3, further comprising:

a current error correction circuit which generates a signal for suppressing an error in a high-frequency component based on a current detected by the current detecting means and the at least one first current command value Ir[n] or based on a current detected by the current detecting means and the second current command value Ir[n+1] and which outputs the signal to the output voltage computing circuit.

5. The control apparatus according to claim 1, wherein the output voltage computing circuit computes, based on a plurality of first current command values and the second current command value Ir[n+1] having been previously set by the current storage portion, a voltage for suppling the electromagnet with a current in accordance with a command, and outputs the voltage with respect to the electromagnet.

6. The control apparatus according to claim 1, further comprising:

an excitation circuit which includes a switching element that connects and disconnects the electromagnet and a power supply to and from each other; and pulse width computing means which computes the pulse width Tp[n+1] used for pulse control of the switching element for each timing, wherein the pulse width Tp[n+1] is computed based on the second current command value Ir[n+1] and the at least one first current command value Ir[n] according to the equation:

$$Tp[n+1] = P[n+1] \times \frac{Lm}{Vd} \times \left( (Ir[n+1] - Ir[n]) + \frac{Rm \times Ts \times I_L}{Lm} \right)$$

wherein: P[n+1] denotes a coefficient presenting a polarity of an increase or decrease of a current, Lm denotes an electromagnet inductance, Rm denotes an electromagnet resistance, Vd denotes a power-supply voltage, Ts denotes a sampling interval, and IL denotes a detected current value.

7. The control apparatus according to claim 1, further comprising:

an excitation circuit which includes a switching element that connects and disconnects the electromagnet and a power supply to and from each other; and pulse width computing means which computes the pulse width Tp[n+1] used for pulse control of the switching element for each timing, wherein the pulse width is computed based on the second current command value Ir[n+1] and the at least one first current command value Ir[n] according to the equation:

$$Tp[n+1] = P[n+1] \times \frac{Lm}{Vd} \times \left( (Ir[n+1] - Ir[n]) + \frac{Rm \times Ts \times I_L}{Lm} + Yi[n] \right)$$

wherein: P[n+1] denotes a coefficient presenting a polarity of an increase or decrease of a current, Lm denotes an electromagnet inductance, Rm denotes an electromagnet resistance, Vd denotes a power-supply voltage, Ts denotes a sampling interval, IL denotes a detected current value, and Yi[n] denotes an integral term.

8. A vacuum pump comprising:

a rotating body;

magnetic bearing means which controls a radial direction position or an axial direction position of the rotating body with an electromagnet;

a current storage portion which stores at least one first current command value Ir[n] having been previously set with respect to a current to be supplied to the electromagnet; and an output voltage computing circuit which computes, based at least on a second current command value Ir[n+1] having been newly set with respect to a current to be supplied to the electromagnet and the at least one first current command value Ir[n] having been read from the current storage portion, a pulse width Tp[n+1] of an output voltage for suppling the electromagnet with a current in accordance with a command, and outputs the output voltage with respect to the electromagnet.

* * * * *